Patented Oct. 16, 1928.

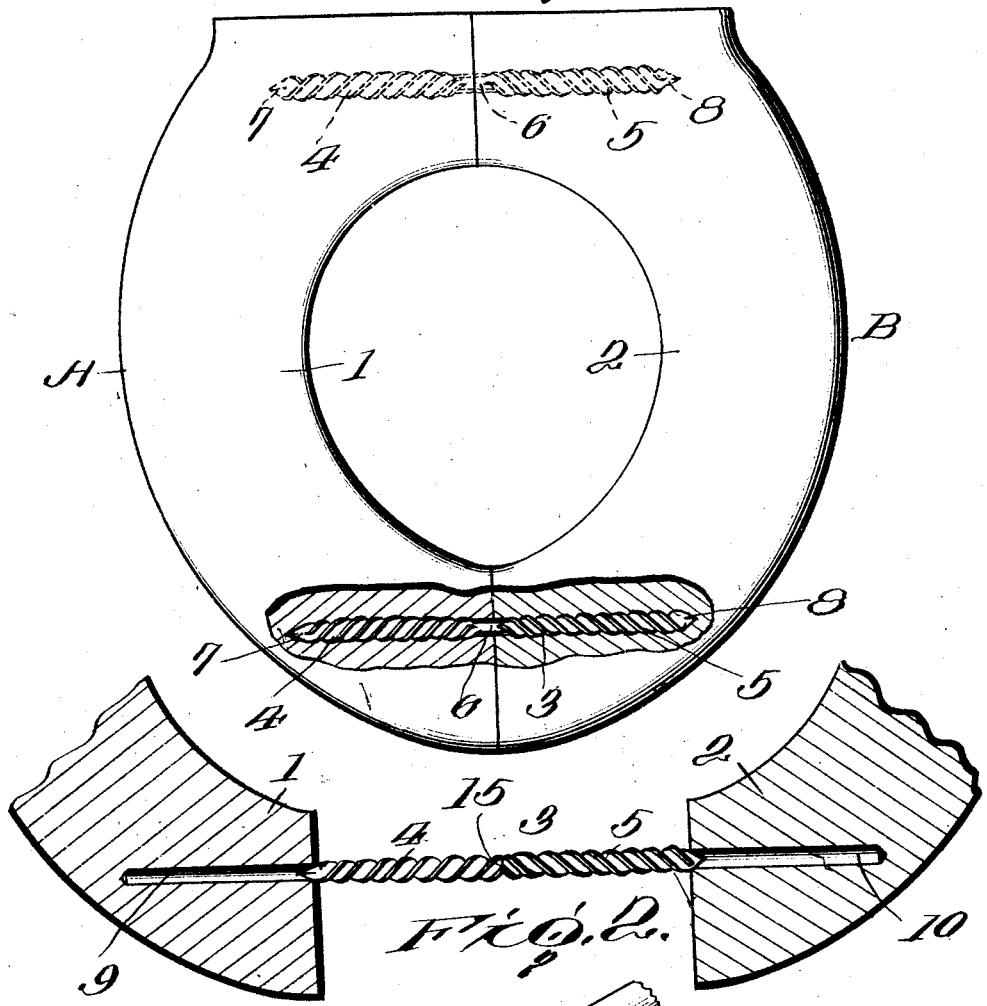

1,688,269

UNITED STATES PATENT OFFICE.

EDWARD L. DELANY, OF BROOKLYN, NEW YORK, AND RICHARD PAUL CHARLES, OF BRISTOL, VIRGINIA, ASSIGNORS TO DELANY REALTY CORPORATION, OF BROOKLYN, NEW YORK.

THREADED CONNECTING MEMBER.

Application filed February 10, 1925. Serial No. 8,278.

Our invention relates to improvements in threaded connecting members.

The object of our invention is to provide a threaded connecting member constructed and arranged to connect two wooden members together so that the threaded securing means are wholly out of sight so that a perfect joint is made, having the appearance of one piece and the members are more particularly designed for connecting the two pieces of a toilet seat together.

Another object of our invention is to provide a threaded member of this character which is applied by pressure on the two members to be secured together, and thus dispense with labor in screwing the members and also insure of the members being drawn up evenly at the same time, so that the faces and edges of the members will be flush, and a tight joint formed.

A further object of our invention is to provide a simple cheap and effective threaded member of this character in which there is a great saving in time and labor in securing two pieces of wood together.

In the accompanying drawings:

Figure 1 is a top plan view of the two sections of a toilet connected by our improved threaded members.

Figure 2 is an enlarged plan view of one of the two sections of a toilet seat showing the first step of the application of the connecting member, and showing the connecting member of a slightly modified form.

Figure 3 is a perspective view of one end of the screw threaded connecting member showing four threads thereon.

Figure 4 is an end view of Figure 3.

Referring now to the drawings, 1 represents one section of the seat and 2 the other section, which are adapted to be connected by our improved threaded connecting members, and while we have shown this in the form of a seat, it will be understood that the same could be used for connecting any two pieces of wood together. The threaded connecting members 3 as shown, are composed of a body portion having the right hand threaded portion 4 at one end and the left hand threaded portion 5 extending inwardly to point adjacent the ends of the threaded member having a blank space 6 intermediate the inner ends of the threads.

This blank portion 6 between the threads is of a diameter slightly less than the bored openings 9 and 10 in the sections, to allow the same to prevent any liability of splitting and at the same time allow of a slight spring between the two threaded portions, if the two openings 9 and 10 are not perfectly drilled. The outer ends of the threaded portions are pointed as indicated at 7 and 8 which is adapted to allow the end portions of the member to pass into the drill openings 9 and 10 in the edges of the sections to be connected, so that the member will start into the openings in their proper position parallel the face of the sections.

Both the right and left hand threaded portions 4 and 5 of the member are provided with four threads 11, 12, 13 and 14 which form a greater holding surface for the connecting member, and due to the series of threads the same is more readily forced into the openings with less pressure, and also insures a positive rotation of the threaded members, as the two members to be connected are forced together. The two members to be connected together, as herebefore stated, are provided with openings 9 and 10 bored into the edges of the same, parallel the faces, and said openings being of a diameter slightly less than the threaded portion of the member, and the connecting members are placed between the two sections to be secured together with their pointed ends 7 and 8 entering the openings 9 and 10, and pressure is applied to the two sections at the point A—B and the members will rotate and travel inwardly into the bored openings, and securely draw the two sections together and hold them to form practically a solid unit.

In the modification shown in Figure 2 of the drawings, the threaded portions 4 and 5 extend into the center point 15 and thus give a longer thread and a greater holding surface where the connecting member is used on narrow sections or members.

Having thus fully described our invention what we claim is:—

A threaded connecting member comprising a central smooth portion, right and left hand coarse wood threaded portions on opposite sides of the central smooth portion, and each threaded portion having a series of threads of such a pitch that the connecting member is caused to rotate and cut its own threads by pressure only in the members to be connected.

In testimony whereof we affix our signatures.

EDWARD L. DELANY.
R. PAUL CHARLES.